United States Patent [19]
Kempf

[11] Patent Number: 5,209,939
[45] Date of Patent: May 11, 1993

[54] METHOD FOR CONTROLLING THE WEIGHT OF CUT PIECES OF DOUGH

[75] Inventor: Thomas P. Kempf, Brooklyn Park, Minn.

[73] Assignee: The Pillsbury Company, Minneapolis, Minn.

[21] Appl. No.: 951,223

[22] Filed: Sep. 25, 1992

[51] Int. Cl.⁵ .................... A21D 8/00; G01N 33/00
[52] U.S. Cl. ........................ 426/231; 425/141; 426/502; 426/503; 426/517
[58] Field of Search .............. 426/231, 496, 502, 503, 426/517; 425/135, 141

[56] References Cited

U.S. PATENT DOCUMENTS

| | | | |
|---|---|---|---|
| 4,849,234 | 7/1989 | Spinelli et al. | 426/231 |
| 5,079,014 | 1/1992 | Morikawa et al. | 426/231 |
| 5,106,636 | 4/1992 | Ban et al. | 426/231 |
| 5,124,163 | 6/1992 | Hayashi | 426/231 |

Primary Examiner—George Yeung
Attorney, Agent, or Firm—Kinney & Lange

[57] ABSTRACT

A method of controlling the weight of cut pieces of dough is disclosed. The method includes determining a target mass loading of a strip of dough, measuring the actual mass loading, comparing the actual and target mass loading values, calculating a calendar roller gap distance which compensates for the rheological properties of the dough and adjusting the gap distance of the last calendar roller pair to equalize the actual and target mass loading values.

9 Claims, 3 Drawing Sheets

METHOD FOR CONTROLLING THE WEIGHT OF CUT PIECES OF DOUGH

BACKGROUND OF THE INVENTION

The present invention relates to a method of forming dough pieces of uniform weight. In particular, this invention relates to a method of continuously sensing the mass loading of a strip of dough and adjusting dough thickness according to the mass loading values before cutting into pieces to maintain uniform dough piece weight.

"Mass loading" for purposes of this disclosure is a weight per unit area of a sheet of dough.

Commercially manufactured dough products are commonly rolled into a sheet and machined with a series of rollers of decreasing gap distance to achieve a desired dough thickness before cutting. The dough is then cut into pieces and packaged for consumer purchase and use.

When manufacturing dough products, it is desirable to maintain a selected target weight product. Overfilling can be costly and can cause the containers to rupture or not seal properly, and underfilling can lead to consumer complaints. It is desirable from a consumer acceptance standpoint as well as a cost standpoint to maintain carefully controlled product weight.

Some refrigerated biscuit and roll doughs are grouped and sold as a group in a spiral wound composite container, such as with refrigerated biscuit dough, for example. When packaging a number of pieces of dough in a single container, it is even more important to maintain a constant weight in each dough piece such that when the pieces are combined, the combined weight of the pieces and container is within an acceptable range of product weight. In general, the larger the number of pieces of dough per container, the more important it is to control the mass loading of the sheet before cutting the pieces.

When dough has rheological properties which cause the dough to spring-back during processing, it is often difficult to control dough piece weight. For example, when the thickness of a sheet of dough is reduced by being passed through rollers having a selected gap distance between opposing rollers, and the resulting dough thickness exceeds the selected gap distance, the dough is said to have "spring back." Dough which has spring back is frequently undergoing pressure flow when passing through the final pair of calendar rollers, which ultimately determines finished cut dough piece thickness. Pressure flow exists when the central portion of the sheet as viewed in cross-section flows at a faster speed than at the outer edges.

The prior art recognizes that the design of a process control system for machining dough should compensate for the flow regime of the dough as described in Spinelli et al. U.S. Pat. No. 4,849,234, column 2, line 38 through column 3, line 31. The process control method shown in Spinelli controls the mass flow rate of a sheet of dough by controlling roller speeds in a series of rollers. The method calculates roller speed ratios to maintain a selected mass flow rate and then trims the individual roller speeds in response to sensed variations in dough consistency. Col. 4, line 66 through Col. 5, line 2.

Hayaski U.S. Pat. No. 5,124,163 shows a method of delivering a sheet of dough of a constant volume by measuring the sheet thickness between an upper pair of opposing rollers and a lower pair of opposing rollers. The speed of the upper pair of rollers is controlled, while the speed of the lower pair of rollers remains constant. The signal from a thickness sensor located on either side of the dough sheet between the upper pair of rollers and the lower pair of rollers is input into a controller which controls the speed of the upper pair of rollers. The distance between opposing lower rollers, or "gap distance" remains constant during operation of the rollers. This method controls dough sheet volume, not dough weight per unit area.

A device is shown in Ban et al. U.S. Pat. No. 5,106,636 which continuously measures the thickness, width and weight of a sheet of dough. The specific weight of the dough is continuously calculated. This data is used to adjust the thickness of a dough strip with a stretching system to make cut dough pieces.

The device shown in Ban et al. includes a hopper and a pair of vertical conveyors positioned below the hopper. The pair of rollers positioned beneath the vertical conveyors reduce the thickness of the sheet of dough. After passing through the first set of rollers, the thickness and weight are measured in the sheet. If the weight per unit time does not equal a predetermined value, the speed of the conveyor is adjusted such that roughly a constant mass of dough is delivered per unit time.

FIG. 1 shows a portion of the process control scheme disclosed in Ban et al. The control loop described above for delivering a roughly constant mass of dough from the first set of rollers is not shown in this Figure. The portion of the process which illustrates how the final dough thickness is determined is shown, however.

The sheet passes through a first stretching device which includes first, middle and second conveyors located beneath the sheet, and an elliptical roller mechanism located above the sheet. After the sheet passes through the first stretching device, the weight, thickness and width of the dough are measured and the specific weight of the dough is calculated, as shown in FIG. 1. A target specific weight is also input into the controller, and the calculated specific weight is compared to the target specific weight. A signal representing the difference between the target specific weight and actual specific weight is generated.

The operator uses the dimensional information to evaluate the rheological properties of the dough. For example, the operator can determine whether or not the dough is too elastic by comparing the width of the sheet to reference values, for example. Then, the composition of the next batch of dough can be adjusted.

A second stretching device is provided. The signal generated by comparing the target and actual specific weights is fed forward and is used to calculate the height of the lower surface of the elliptical roller relative to the upper surface of the lower conveyor, near the exit end of the elliptical roller. The height is then adjusted, which adjusts the dough sheet thickness.

When the dough is strongly plastic, the process further adjusts the sheet thickness by increasing the speed of the third conveyor after the roller mechanism is lifted based on the following formula:

$$V_2 = (T \times V_1)/T$$

where $V_1$ is the velocity of the second conveyor, T is the dough strip thickness and $V_2$ is the adjusted third conveyor velocity.

SUMMARY OF THE INVENTION

The present invention is a method of controlling the weight of dough pieces cut from a sheet of dough. The method may be advantageously practiced on an automated dough processing line having an inlet hopper; a plurality of conveyors for moving the dough; at least one roller bank for decreasing the dough thickness; a mass loading sensor; a programmable controller; a position indicator and position controller for each pair of rollers in the last roller bank contacting the dough; and a cutting device. What is meant by "roller bank" for purposes of this disclosure is a plurality of closely spaced pairs of calendar rollers. Each pair of calendar rollers are vertically spaced apart have an opening defining a dough passage which is referred to for purposes of this disclosure as "gap distance." The gap distances of each roller pair in the roller bank become progressively smaller from one end to the opposite end.

The method of the present invention includes a step of determining the target or desired mass loading of the dough being processed. This step is advantageously accomplished by inputting a finished packaged product weight "A", an empty package weight "B", the area per piece of dough "C" and the number of pieces of dough per container "D" into the controller. This information is used to compute a target mass loading "$M_1$" according to the following formula:

$$M_1 = (A-B)/(C \times D) \quad (1)$$

The method of the present invention includes the step of measuring the actual mass loading of a portion of the dough strip after passing through the last calendar roller, prior to cutting. This step is advantageously accomplished by means of a gamma radiation source and sensor.

The method of the present invention also compares the target and actual mass loading, and computes a gap distance between the final pair of calendar rollers contacting the dough prior to the cutting step. According to the preferred method of the present invention, a programmable controller uses the actual mass loading values as well as the target mass loading values to arrive at a final desired dough sheet thickness $T_f$ which equalizes the actual and target mass loading values. However, since the dough is likely to be elastic, the present invention calculates a gap distance G which accounts for spring back and can be smaller than the final dough sheet thickness $T_f$.

The method of the present invention includes the step of calculating a gap distance between the last pair of calendar rollers which compensates for the rheological properties of the dough. The method of the present invention utilizes a relationship which equates initial dough thickness $T_i$ which is the thickness of the dough just before entering the final set of rollers, $T_f$ which is the final dough thickness just after exiting the final set of rollers, and G which is the gap distance required to equalize target mass loading and actual mass loading values.

The method of the present invention also includes the process step of adjusting the gap distance of the last pair of calendar rollers according to the calculated value for G.

DETAILED DESCRIPTION OF THE PREFERRED EMBODIMENTS

The present invention is a method of controlling the weight of pieces of dough cut from a continuous sheet. The method of the present invention advantageously accounts for variation in dough sheet density and adjusts the gap distance between a pair of calendar rollers which make the final thickness adjustment to the sheet prior to cutting. The method of the present invention also accounts for the rheological properties of the dough such as spring back when calculating gap distance. The gap distance according to the most preferred method is adjusted on a constant basis in response to variations in mass loading in the sheet.

Figure 1:
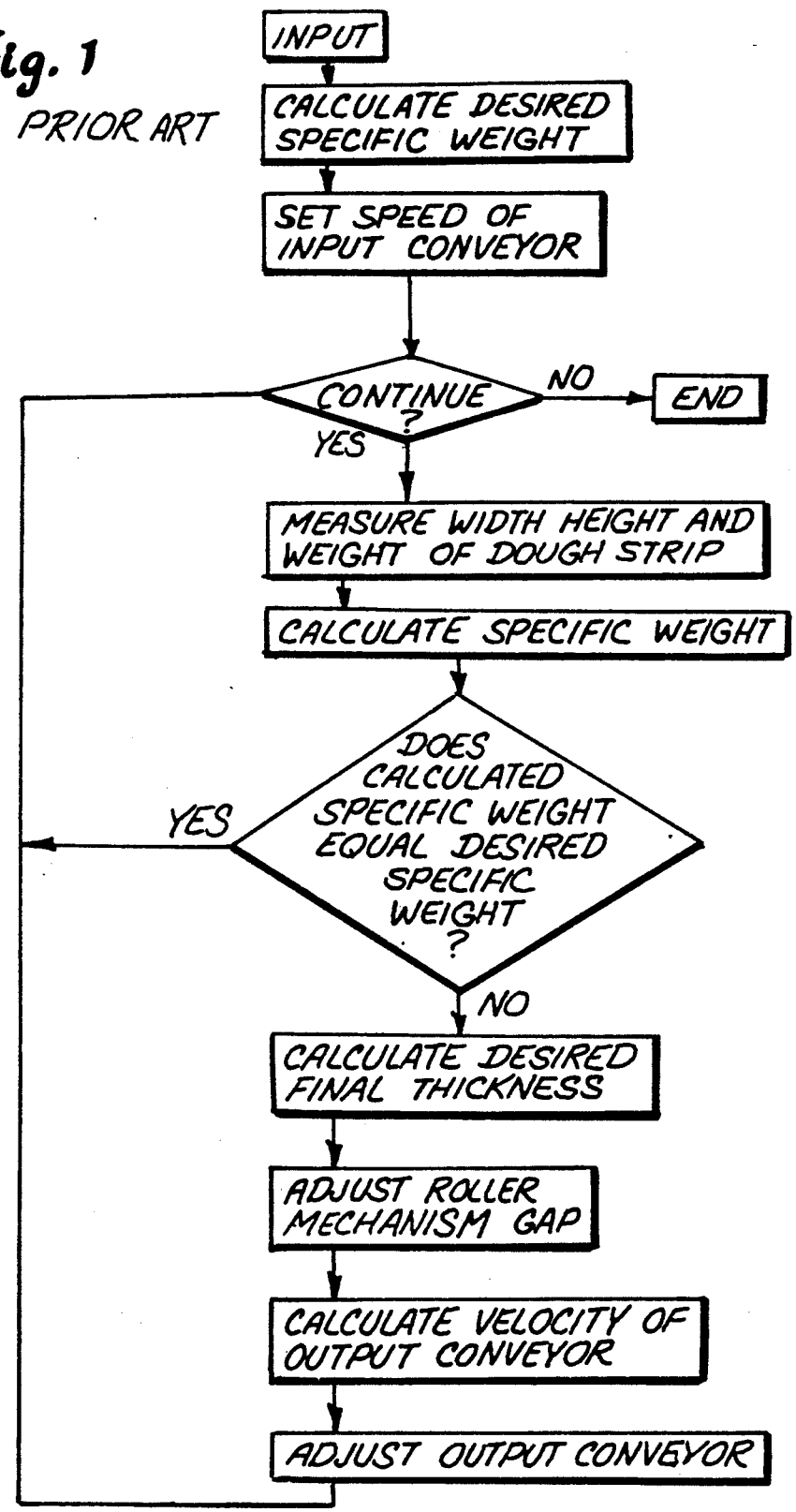
FIG. 1 is a flow diagram of a control scheme known in the art.
Figure 2:
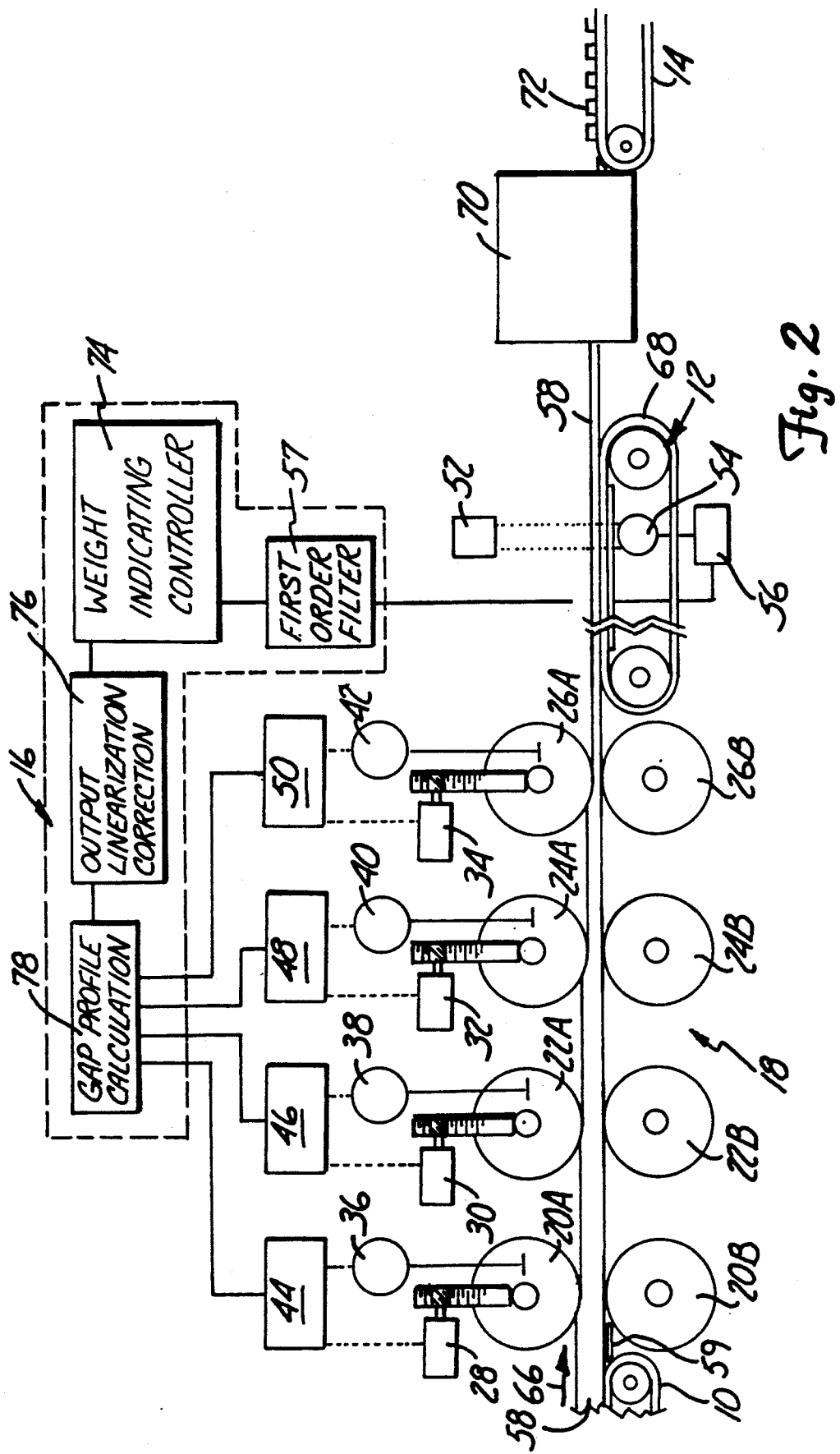
FIG. 2 is a schematic side elevational view of an apparatus for practicing the method of the present invention.

FIG. 2 is a schematic side elevational view of a preferred apparatus for practicing the method of the present invention. The method of the present invention preferably employs an apparatus including a feed conveyor 10, an intermediate conveyor 12 and a finished product conveyor 14 for moving a sheet of dough through the apparatus.

The feed conveyor 10 receives a sheet of dough which has been fed from a hopper (not shown) and has preferably been fed through at least one roller bank (not shown), forming a sheet which is thicker than the desired thickness of the finished product. The feed conveyor 10, intermediate conveyor 12 and finished product conveyor 14 are each conventional dough moving conveyors. Each conveyor 10, 12 and 14 is driven by a motor (not shown).

It is to be understood that the speed of each conveyor 10, 12 and 14 is controlled by a computer means such as a P.I.D. controller, for example which is independent of the method of control of the present invention.

Upstream of the feed conveyor 10 is a roll stand 18 which according to the preferred method includes four pairs of rollers 20A and 20B, 22A and 22B, 24A and 24B and 26A and 26B. Each pair of rollers 20A and 20B for example is vertically spaced, the spacing between each pair defining the gap distance. Each pair of rollers according to the preferred embodiment are spaced apart along the path of dough.

In the preferred embodiment, the position of each upper roller 20A, 22A, 24A and 26A is movable substantially vertically by means of a position actuator 28, 30, 32 and 34 on each upper roller 20A, 22A, 24A and 26A, respectively. Mounted proximate each upper calendar roller 20A, 22A, 24A and 26A is a position sensor 36, 38, 40 and 42. Each sensor 36, 38, 40 and 42 sends a signal to a position indicating controller 44, 46, 48 and 50, each of which is programmed to adjust the gap distance between each pair of calendar rollers 20A and 20B, 22A and 22B, 24A and 24B, and 26A and 26B, respectively. The precise method of adjusting the gap distance will be described in more detail below.

A programmable controller 16 is provided to adjust the gap distances of one or more sets of calendar rollers in the roller bank 18 in response from operator inputs and system inputs. The precise function of the controller 16 will be described in more detail below.

The machined dough according to the preferred method passes onto the intermediate conveyor 12, over a sensor 54 beneath the sheet which receives signals from a sensing device 52 such as a gamma radiation source 52 located directly above the sensor 54 and the sheet of dough 58. The sensor 54 sends a signal to a transmitter 56 which transmits a signal representing density back to the system controller 16. According to the preferred method, a Kay-Ray Model 6060 Digital Weigh Scale, available from Kay-Ray/Sensall, Inc. of Mt. Prospect, Illinois is used to sense mass loading of a sheet of dough. The transmitter divides the weight by the area being sensed to output a signal representing mass loading.

After passing over the mass loading sensor 54, the dough sheet 58 passes through a cutting device 70 which deposits cut dough pieces 72 onto the finished product conveyor 14. The finished product conveyor and the cutting device are conventional types known in the art. The dough pieces 72 are preferably grouped into stacks of pieces and are packaged into containers such as composite spiral wound containers.

The controller 16 used to practice the method of the present invention has four distinct functions. The controller 18 includes a first order filter 57; a weight indicating controller 74; an output linearization correction 76, and a gap profile calculator 78. Each function will be described in detail below.

Figure 3:
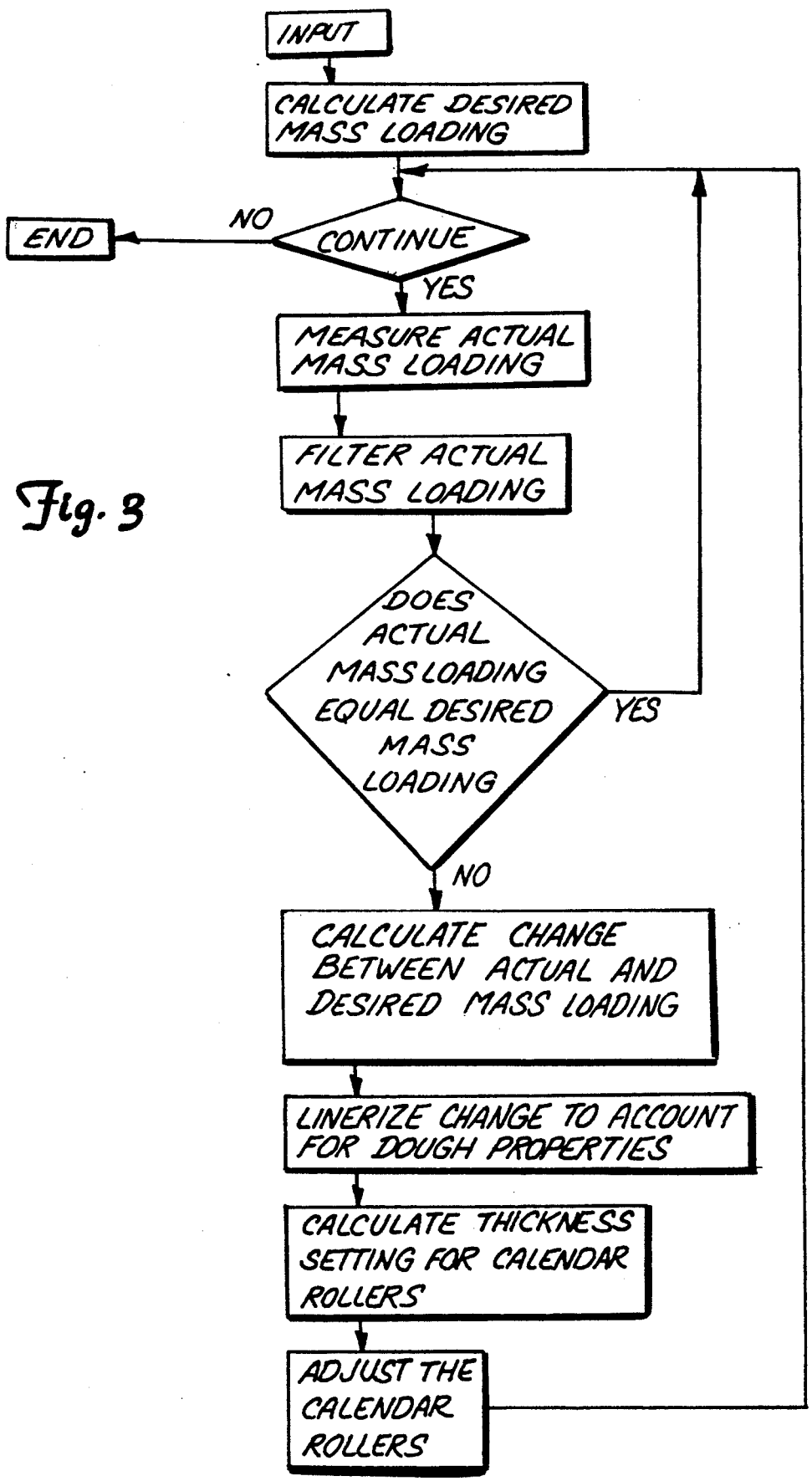
FIG. 3 is a flow diagram of the preferred process of the present invention.

A flow diagram of a preferred method of the present invention is shown in FIG. 3. The method of the present invention includes the step of determining the target mass loading of a portion of the dough sheet. This step is preferably accomplished by manually inputting data into the controller 16 for calculating a target mass loading value, $M_t$. Preferably, the weight of a filled container "A", the weight of an empty container "B", the area per piece "C" and the number of pieces per container "D" are entered. From this information, the controller 16 calculates a target mass loading in the units of weight per unit area according to the following formula:

$$(A-B)/(C \times D) = M_t \quad (1)$$

The method of the present invention includes the step of measuring the actual mass loading of a portion of the dough strip after the strip passes through the gap "G" between the last set of calendar rollers. The controller 16 receives a signal from the transmitter 56 which represents the actual mass loading of the dough sheet. Preferably, the transmitter receives a signal representing weight and converts the signal to one representing mass loading by dividing the weight by the area being sensed to calculate the actual mass loading $M_a$.

The method of the present invention includes the process step of comparing actual mass loading values $M_a$ to the target mass loading values $M_t$. Preferably, $M_t$ the method includes the further step of filtering the signal from the transmitter 56 by means of a first order filter 57 to eliminate process noise prior to being inputted into the weight indicating controller 74. According to the preferred method, if the two values are equal, no process adjustments are made.

The method of the present invention includes a step of calculating a gap distance "G" for the last pair of calendar rollers 26A and 26B which contact the dough prior to reaching the cutting device 70. The method of calculation advantageously compensates for the rheological properties of the dough.

According to the preferred method, the controller 16 performs a linearization correction 76 which compensates for the elastic behavior of the dough exiting from the last pair of calendar rollers 26A and 26B. Although it is not necessary that the dough being processed possess elastic behavior when traveling through the final set of calendar rollers 26A and 26B, the method of the present invention compensates for elastic behavior if it is present.

The controller 16 is programmed with an output linearization correction function 76 represented by the following formula:

$$G = \frac{-1}{a} \ln\left(1 - \frac{T_f}{T_i}\right) \quad (2)$$

where "G" is the gap distance, "a" is a constant which is experimentally determined for a given dough system, "$T_f$" is the thickness of the dough after passing through the last pair of calendar rollers 26A and 26B, and "$T_i$" is the initial dough thickness just prior to entering the last set of calendar rollers 26A and 26B. The computation represented by equation (2) is referred to as the linearization correction 76 and functions to deliver linear input to the position controller 50 in response to nonlinear input from the transmitter 56. Providing linear output to the position controller 50 on the last pair of calendar rollers 26A and 26B advantageously provides for a stable control system.

The first step in calculating the desired gap distance "G" is to first determine what final dough thickness $T_f$ is required to equalize the actual mass loading and target mass loading values. The controller is programmed to calculate the desired dough sheet thickness $T_f$ required to equalize the actual mass loading value and the target mass loading value as described above from the output from the sensor 54. The $T_f$ value is obtained by dividing the target mass loading by the actual measured density.

To initialize the controller 16 Ti can be assumed equal to the gap distance G of the set of rollers adjacent to the last pair of rollers 26A and 26B. In the device described above, G3 is the gap distance for the third set of rollers 24A and 24B. After initialization, the digital controller outputs gap changes to achieve final thickness changes. These outputted gap changes eliminate the need to measure Ti, as one skilled in the art would know.

The initial dough thickness $T_i$ and final dough thickness $T_f$ are input into equation (2) to obtain a gap distance G. The constant "a" is experimentally determined for a given dough system by collecting data showing the relationship between the gap distance of the last pair of calendar rollers 26A and 26B, the dough thickness before entering the pair of calendar rollers 26A and 26B, and the thickness after exiting the calendar rollers 26A and 26B. The value "a" is therefore experimentally determined for a given dough system in a manner known in the art.

The method of the present invention includes the step of adjusting the gap distance between the last pair of calendar rollers to equal the value "G" obtained from the linearization correction 76. Preferably, the output from the linearization correction function 76 is fed into a position controller 50 and is compared to a signal output from a position sensor 42. If the position of the upper calendar roller 26A is other than what the linearization correction indicates the position should be, the position controller 50 instructs the position actuator 34 to move the calendar roller 26A into a position which sets the gap distance equal to "G". Once the gap distance is set, the resulting dough exiting from the final set of calendar rollers 26A and 26B has a constant weight per unit area and the resulting dough pieces are therefore of uniform weight.

The preferred method of the present invention includes an additional step of calculating gap distances for the remaining calendar rollers in the roller bank 18 by means known in the art. One such means is to determine the dough thickness entering the first set of rollers in the roller bank 18, and setting the gaps by plotting the initial and final thicknesses on a graph with the thickness on the "y" axis and the calendar roller number on the "x" axis. The calendar roller numbers are equally spaced along an axis of a grid. A straight line is drawn through the initial thickness going into the first roller which intercepts zero on the "x" axis, and through the final calendar roller gap distance "G" at the fourth roller. The remaining roller gap distances are determined graphically.

The mass loading of the dough is continuously monitored, and the gap adjustments are continuously repeated such that the dough sheet mass loading is continuously maintained at a value that is equal to the desired mass loading value. The constant mass loading enables the dough to be cut into biscuit-shaped pieces 72 of equal weight by a cutter 70 that is preferably positioned at the end of the second conveyor. The biscuit-shaped pieces are then transported on a finished product conveyor 14 to another area for additional processing such as packaging.

Although the present invention has been described with reference to preferred embodiments, workers skilled in the art will recognize that changes may be made in form and detail without departing from the spirit and scope of the invention.

What is claimed is:

1. A method of controlling the weight of dough pieces cut from a strip of dough, the dough strip passing through at least one pair of calendar rollers prior to passing through a cutting device, the method comprising:
   determining a target mass loading of a dough strip;
   measuring an actual mass loading of a portion of the dough strip after passing through the pair of calendar rollers nearest to the cutting device;
   comparing the target and actual mass loading data;
   calculating a calendar roller gap distance for the pair of calendar rollers nearest to the cutting device that compensates for the rheological properties of the dough; and
   adjusting the gap distance of the last pair of calendar rollers in a manner which equalizes the actual mass loading and target mass loading values.

2. The method of claim 1, wherein the dough passes through a plurality of pairs of calendar rollers, and further comprising the step of calculating gap distances for the remaining pairs of calendar rollers.

3. The method of claim 2, and further comprising the step of adjusting the gap distance between each remaining calendar roller.

4. The method of claim 1, wherein the step of determining a target mass loading of a portion of the dough strip comprises selecting target values for dough piece unit area, number of pieces of dough per container, an empty container weight and a filled container weight.

5. The method of claim 1 wherein the actual mass loading is measured by means of a sensing device which generates a signal output, and further comprising the step of filtering the signal output from the sensor used to sense the actual mass loading prior to comparing the target and actual mass loading data.

6. The method of claim 5 wherein the step of sensing an actual mass loading of a portion of the dough strip is accomplished by means of a gamma sensor.

7. The method of claim 5 wherein the step of sensing mass loading is substantially continuous.

8. The method of claim 1 wherein a programmable controller is provided to:
   accept mass loading input values,
   calculate a mass loading setpoint from the mass loading input values,
   receive output from a device for measuring mass loading;
   filter the output;
   compare the setpoint with filtered actual mass loading output;
   calculate a dough thickness which equalizes the mass loading setpoint and actual mass loading output; and
   calculate a gap distance between a last set of calendar rollers before the cutter in a manner which sends a linear signal to at least one position controller on the pair of calendar rollers nearest to the cutting device.

9. The method of claim 1 wherein the step of calculating a gap distance between the set of rollers closest to the cutting device employs the following mathematical relationship:

$$G = \frac{-1}{a} \ln\left(1 - \frac{T_f}{T_i}\right)$$

where $G$ = gap thickness; $a$ = experimentally determined constant; $T_f$ = final dough thickness which equalizes mass loading; and $T_i$ = dough thickness prior to passing through the set of rollers closest to the cutting device.

* * * * *